(12) United States Patent
Zhang et al.

(10) Patent No.: US 12,222,463 B2
(45) Date of Patent: Feb. 11, 2025

(54) METHOD FOR GEOMAGNETICALLY DETECTING SUBMARINE CABLE

(71) Applicant: ELECTRONIC UNIVERSITY OF SCIENCE & TECHNOLOGY OF HANGZHOU, Zhejiang (CN)

(72) Inventors: Xueting Zhang, Zhejiang (CN); Fang Wang, Zhejiang (CN); Xiaoqing Tian, Zhejiang (CN); Jingbiao Liu, Zhejiang (CN); Zefei Zhu, Zhejiang (CN)

(73) Assignee: ELECTRONIC UNIVERSITY OF SCIENCE & TECHNOLOGY OF HANGZHOU, Hangzhou (CN)

( * ) Notice: Subject to any disclaimer, the term of this patent is extended or adjusted under 35 U.S.C. 154(b) by 0 days.

(21) Appl. No.: 17/790,095

(22) PCT Filed: Jun. 22, 2021

(86) PCT No.: PCT/CN2021/101473
§ 371 (c)(1),
(2) Date: Jun. 29, 2022

(87) PCT Pub. No.: WO2022/217742
PCT Pub. Date: Oct. 20, 2022

(65) Prior Publication Data
US 2024/0201410 A1    Jun. 20, 2024

(30) Foreign Application Priority Data
Apr. 14, 2021    (CN) .......................... 202110397860.3

(51) Int. Cl.
*G01V 3/08*    (2006.01)
*B63G 8/00*    (2006.01)

(52) U.S. Cl.
CPC .............. *G01V 3/08* (2013.01); *B63G 8/001* (2013.01); *B63G 2008/004* (2013.01)

(58) Field of Classification Search
CPC .............. B63G 8/001; B63G 2008/004; B63G 2008/007; B63G 2008/008;
(Continued)

(56) References Cited

U.S. PATENT DOCUMENTS 3,835,371 A * 9/1974 Mirdadian ................ G01V 3/10
324/329
3,875,497 A * 4/1975 Madsen .................. G01V 3/081
324/345
(Continued)

FOREIGN PATENT DOCUMENTS

CN    106405662 A    2/2017
CN    108045530 A    5/2018
(Continued)

OTHER PUBLICATIONS

International Search Report of PCT/CN2021/101473.
Written Opinion of PCT/CN2021/101473.

*Primary Examiner* — Steven B Theriault (57) ABSTRACT

Embodiments provide a method for geomagnetically detecting a submarine cable, including: performing a preliminary detection by controlling an underwater robot equipped with a proton magnetometer; determining a preliminary direction and location of the cable based on preliminary detection information; controlling the underwater robot equipped with the proton magnetometer and two fluxgate magnetometers to launch into the water; controlling the underwater robot to travel over the cable and determining specific location information of the cable; controlling a heading of the underwater robot to move along the preliminary direction of the cable; and controlling the underwater robot equipped with the proton magnetometer and the two fluxgate magnetometers to launch into the water; determining whether a fault in the submarine cable occurs and a location of a fault (Continued)

point, based on Z-axis components of the general geomagnetic field and launching depth data of the underwater robot.

11 Claims, 5 Drawing Sheets

(58) Field of Classification Search
CPC ........ B63G 2008/005; B63G 2008/002; B63G 8/08; B63G 8/00; B63G 7/08; B63G 7/06; G01V 1/3852; G01V 1/3808; G01V 1/38; G01V 2210/1427; G01V 3/083; G01V 3/08; G01V 3/081; G01V 3/12; G01V 1/201; G01V 1/3835; G01V 3/165; B63C 11/52; B63B 2035/006; B63B 2035/007; B63B 2211/02; G01S 15/89; G01R 31/083
See application file for complete search history.

(56) References Cited

U.S. PATENT DOCUMENTS

| | | | | |
|---|---|---|---|---|
| 4,047,098 A * | 9/1977 | Duroux | ................... | G01V 3/08 324/335 |
| 4,384,808 A * | 5/1983 | Yamamura | ............... | E02F 5/107 405/160 |
| 4,430,613 A * | 2/1984 | French | ................... | G01V 3/081 324/345 |
| 4,438,401 A | 3/1984 | Iwamoto et al. | | |
| 4,537,530 A * | 8/1985 | Yamamura | ............ | E02F 9/2045 405/160 |
| 5,764,061 A * | 6/1998 | Asakawa | ................ | G01V 3/02 324/365 |
| 5,828,219 A * | 10/1998 | Hanlon | .................... | G01V 3/06 324/67 |
| 6,476,610 B1 * | 11/2002 | Wiegert | ................... | B63G 7/06 324/225 |
| 6,484,660 B1 * | 11/2002 | English | ................... | B63G 8/38 367/133 |
| 7,030,616 B1 * | 4/2006 | Boland | ................ | H04B 10/118 324/67 |
| 7,038,458 B1 * | 5/2006 | Wiegert | ................. | G01V 3/081 324/345 |
| 7,203,599 B1 * | 4/2007 | Strack | ................... | G01V 3/12 324/354 |
| 8,148,992 B2 * | 4/2012 | Kowalczyk | ............ | G01V 3/104 324/365 |
| 8,321,161 B1 * | 11/2012 | Bruno | .................... | G01C 17/38 702/92 |
| 9,146,331 B2 * | 9/2015 | Saether | ................ | G01R 31/12 |
| 10,132,956 B2 * | 11/2018 | Kowalczyk | ............ | G01V 3/40 |
| 10,151,079 B2 * | 12/2018 | Anderson | ................ | E02F 5/105 |
| 10,534,031 B2 * | 1/2020 | Godfrey | ............... | G01R 31/086 |
| 10,928,535 B2 * | 2/2021 | Halliday | ............ | G01V 1/3808 |
| 11,061,160 B1 * | 7/2021 | Weber | ....................... | F16L 1/12 |
| 11,287,336 B2 * | 3/2022 | Godfrey | ................... | H02G 9/02 |
| 11,340,376 B2 * | 5/2022 | Majima | ................ | G01V 3/165 |
| 11,614,500 B2 * | 3/2023 | Bartos | ...................... | G07D 7/04 324/252 |
| 2004/0022585 A1 * | 2/2004 | Wallace | ................... | E02F 5/003 405/163 |
| 2005/0057559 A1 * | 3/2005 | Komarechka | ............ | G01V 1/34 345/418 |
| 2005/0099177 A1 * | 5/2005 | Greelish | .............. | G01R 33/025 324/252 |
| 2007/0096729 A1 * | 5/2007 | Brunson | .............. | G01R 33/022 324/244 |
| 2008/0284441 A1 * | 11/2008 | Kowalczyk | ............ | G01V 3/104 324/334 |
| 2009/0316524 A1 * | 12/2009 | Tenghamn | ............ | G01V 1/3852 367/16 |
| 2010/0321024 A1 * | 12/2010 | Nichols | ................... | G01V 3/083 324/348 |
| 2012/0069702 A1 * | 3/2012 | Muyzert | ............... | G01V 1/3808 367/15 |
| 2012/0134234 A1 * | 5/2012 | Roberts | ................... | B32B 21/13 367/19 |
| 2013/0025523 A1 * | 1/2013 | Frejaville | ................ | B63B 27/18 114/337 |
| 2014/0027122 A1 * | 1/2014 | Meier | ...................... | G01V 1/04 367/21 |
| 2014/0230713 A1 * | 8/2014 | Kimura | .................. | B63G 8/001 114/313 |
| 2014/0355383 A1 * | 12/2014 | McEwen-King | ...... | G01H 9/004 367/88 |
| 2015/0020605 A1 * | 1/2015 | Braunstein | .............. | G01L 1/242 73/800 |
| 2015/0061659 A1 * | 3/2015 | Freear | .................... | G01N 27/72 324/238 |
| 2015/0192488 A1 * | 7/2015 | Xu | ......................... | B63G 8/001 348/81 |
| 2016/0097875 A1 * | 4/2016 | Kowalczyk | ............. | G01V 3/40 701/21 |
| 2016/0214693 A1 * | 7/2016 | Habeger | .................. | B63G 8/20 |
| 2016/0349334 A1 * | 12/2016 | Snoeij | .................. | G01R 33/04 |
| 2017/0082762 A1 * | 3/2017 | Watts | .................... | G01V 1/3852 |
| 2018/0209266 A1 * | 7/2018 | Clark | ....................... | G01V 3/26 |
| 2019/0212299 A1 * | 7/2019 | Freear | .................... | G01N 27/82 |
| 2020/0271733 A1 * | 8/2020 | Jourdan | ............... | G01R 33/022 |
| 2020/0326444 A1 * | 10/2020 | Zheng | .................. | G01V 3/081 |
| 2021/0362816 A1 * | 11/2021 | Mukaida | ............... | G01S 5/28 |
| 2023/0160939 A1 * | 5/2023 | Wang | ....................... | G06N 3/08 324/512 |

FOREIGN PATENT DOCUMENTS

| | | |
|---|---|---|
| CN | 110927801 A | 3/2020 |
| CN | 110941017 A | 3/2020 |
| CN | 112558006 A | 3/2021 |
| JP | 2009229137 A | 10/2009 |

* cited by examiner

METHOD FOR GEOMAGNETICALLY DETECTING SUBMARINE CABLE

CROSS-REFERENCE TO RELATED APPLICATIONS

This application is a national stage application of PCT/CN2021/101473. This application claims priorities from PCT Application No. PCT/CN2021/101473, filed Jun. 22, 2021, and from the Chinese patent application 2021103978603 filed Apr. 14, 2021, the content of which are incorporated herein in the entirety by reference.

TECHNICAL FIELD

The present disclosure belongs to the technical field of submarine detection, and in particular, relates to a method for geomagnetically detecting a submarine cable.

BACKGROUND

The detection, identification and positioning of submarine cables are recognized technical problems in the field of marine engineering. The traditional method is mainly based on manual observation by divers. In recent years, with the rapid development of underwater robot technology, the technical method of automatic inspection through underwater robots equipped with various loads of acoustics, optics and magnetics is attracting attention. However, because submarine cables are mostly laid below the surface of the seabed, optical methods, as well as most acoustic methods, do not work well. The acoustic method such as shallow profiling can detect subsurface, but is limited by the acoustic detection resolution due to the limited diameter of the cable. The method based on the inversion of the geomagnetic anomaly field is the most potential method at present to detect the submarine buried cable. However, due to the lack of in-depth research on the detection process and detection method, the signal is still interfered by the complex background field in practical applications, the low reliability of the suspected anomaly and other defects are presented.

Patent CN201711262447.6 discloses a submarine cable detection underwater robot and an operation method, and specifically discloses: when the underwater robot is in an AUV mode, the underwater robot is in a cableless state at this time, and can escape from the limitation of the surface mother ship. The instructions can be received by digital radio and composite antenna, and operating tasks and travel routes outside the communication range can be independently set to complete the routing survey and daily inspection of submarine cables. When the underwater robot is in a ROV mode, the underwater robot is in a cabled state at this time, and communicates with the remote control platform through the umbilical cable. It can upload video images or other sensor information in real time, and receive electrical energy from the surface mother ship to charge to complete the seabed cable fault detection and pinpointing jobs. The invention adopts the underwater robot in the cableless AUV mode and the cabled ROV mode for detection, and needs to switch different working modes during the detection process. During the detection process in cabled ROV mode, the location and type of submarine cable faults are mainly judged by video images and other sensor information.

SUMMARY

Technical Problem

Aiming at the problems existing in the prior art, the present disclosure provides a method for geomagnetically detecting submarine cables with high reliability of fault detection results.

Technical Solutions

The present disclosure is achieved through the following technical solutions:

A method for geomagnetically detecting a submarine cable, applied to detection control terminals, comprising steps of:

step S01, performing a preliminary detection by controlling an underwater robot equipped with a proton magnetometer; and then determining a preliminary direction and a preliminary location of the cable based on preliminary detection information: the preliminary detection information comprising underwater positioning data and a general geomagnetic field;

step S02, performing a route detection by controlling the underwater robot equipped with the proton magnetometer and two fluxgate magnetometers to launch into the water, according to preliminary location information; then, controlling the underwater robot to travel over the cable and determining specific location information of the cable, based on the general geomagnetic field measured by the proton magnetometer during the route detection; and, controlling a heading of the underwater robot to move along the preliminary direction of the cable, based on an X-axis component gradient value obtained by the two fluxgate magnetometers; and step S03, performing a patrol detection by controlling the underwater robot equipped with the proton magnetometer and the two fluxgate magnetometers to launch into the water, according to the specific location information: then, determining whether a fault in the submarine cable occurs and a location of a fault point, based on Z-axis components and launching depth data of the underwater robot measured by the two fluxgate magnetometers;

where the proton magnetometer is installed in front of the underwater robot, and the two fluxgate magnetometers are installed on both sides of the underwater robot.

In the present disclosure, the position information of the cable can be corrected in real time based on the geomagnetic information, so that the detection process is always carried out along the direction of the cable. The detection is accurate, and the realization is simple. The direction of the cable is constantly corrected during the detection process.

In an embodiment, the step S01 comprises:

step S11, determining a comb-shaped path covering an entire detection range as a preliminary detection path of the underwater robot equipped with the proton magnetometer, based on a detection range of the submarine cable;

step S12, performing the preliminary detection according to the preliminary detection path by controlling the underwater robot under a certain launching depth, and recording the preliminary detection information; and step S13, determining the preliminary direction and preliminary location information of the cable based on the preliminary detection information after the preliminary detection of the underwater robot is completed.

In an embodiment, determining the preliminary direction and preliminary location of the cable information based on the preliminary detection information comprises:
forming a two-dimensional contour map based on the preliminary detection information;
correlating dense areas with maximum values or minimum values of geomagnetic locals; and
determining the preliminary direction and preliminary location information of the cable.

In an embodiment, the detection range of the submarine cable is a rectangular detection range determined based on historical data of the submarine cable.

In an embodiment, the step S02 comprises:
step S21, determining a launching location of the underwater robot equipped with the proton magnetometer and the two fluxgate magnetometers, according to the preliminary location information;
step S22, controlling the underwater robot to launch at the launching location, and controlling the underwater robot to travel to hover right over the cable;
step S23, controlling the underwater robot to translate along the preliminary direction of the cable according to the preliminary direction of the cable, and adjusting a translation direction of the underwater robot according to a change of the general geomagnetic field measured by the proton magnetometer: determining the location hover right over the cable at a peak of the general geomagnetic field after adjusting the translation direction several times, and determining the specific location information of the cable; and
step S24, controlling the underwater robot to travel, and controlling the heading of the underwater robot to move along the preliminary direction of the cable, based on the X-axis component gradient value obtained by the two fluxgate magnetometers during a travelling process.

In an embodiment, the step S02 further comprises a step of determining a specific direction of the cable: after the step S23 and before the step S24, controlling the underwater robot to rotate clockwise and counterclockwise 360 degrees for several times in a hover position, and determining an azimuth angle of the cable based on an X-axis maximum value and a Y-axis maximum value obtained after each rotation, and then determining the specific direction of the cable:
in the step S24, the heading of the underwater robot is controlled to move along the specific direction of the cable.

In an embodiment, controlling the heading of the underwater robot to move along the preliminary direction of the cable, based on the X-axis component gradient value obtained by the two fluxgate magnetometers during a travelling process comprises:
controlling the heading of the underwater robot to turn to a left, when it is determined that the X-axis component gradient value is greater than an X-axis positive gradient threshold, and a change value of the general geomagnetic field is greater than a change threshold of the general geomagnetic field;
controlling the heading of the underwater robot to translate to the left, when it is determined that the X-axis component gradient value is greater than the X-axis positive gradient threshold and the change value of the general geomagnetic field is not greater than the change threshold of the general geomagnetic field;
controlling the heading of the underwater robot to turn to a right, when it is determined that the X-axis component gradient value is less than the X-axis negative gradient threshold, and the change value of the general geomagnetic field is greater than the change threshold of the general geomagnetic field;
controlling the heading of the underwater robot to translate to the right, when it is determined that the X-axis component gradient value is less than the X-axis negative gradient threshold, and the change value of the general geomagnetic field is not greater than the change threshold of the general geomagnetic field;
where the X-axis component gradient value is a difference between X-axis component values measured by the two fluxgate magnetometers.

In an embodiment, the step S03 comprises:
step S31, determining the launching location of the underwater robot equipped with the proton magnetometer and the two fluxgate magnetometers according to the specific location information;
step S32, controlling the underwater robot to launch at the launching location, and controlling the underwater robot to perform the patrol detection along the direction of the cable under the certain launching depth;
step S33, determining whether a fault in the submarine cable occurs and a location of the fault point based on the Z-axis component values measured by the two fluxgate magnetometers and the launching depth data of the underwater robot.

In an embodiment, the step S33 specifically comprises:
determining that a current location of the underwater robot has the fault, and the current location is the location of the fault point, when it is determined that absolute values of the Z-axis component values of the two fluxgate magnetometers both exceed a Z-axis component threshold, and an absolute value of a change of the launching depth data of the underwater robot in a same period is less than a change threshold of the launching depth data.

In an embodiment, the two fluxgate magnetometers are respectively installed on both sides of the front of the underwater robot.

Beneficial Effect

The method for geomagnetically detecting a submarine cable is applied in marine engineering fields such as ocean power transmission, island development, offshore wind power, offshore oil and gas platforms, coastal zone surveys, rescue and salvage, etc. The present disclosure adopts a geomagnetic detection method based on an underwater cableless autonomous robot to identify and locate known or unknown submarine cables.

DESCRIPTION OF EMBODIMENTS

The following are specific embodiments and the accompanying drawings according to the present disclosure, used to further describe the technical solutions of the present disclosure, but the present disclosure is not limited to these embodiments.

Figure 1:
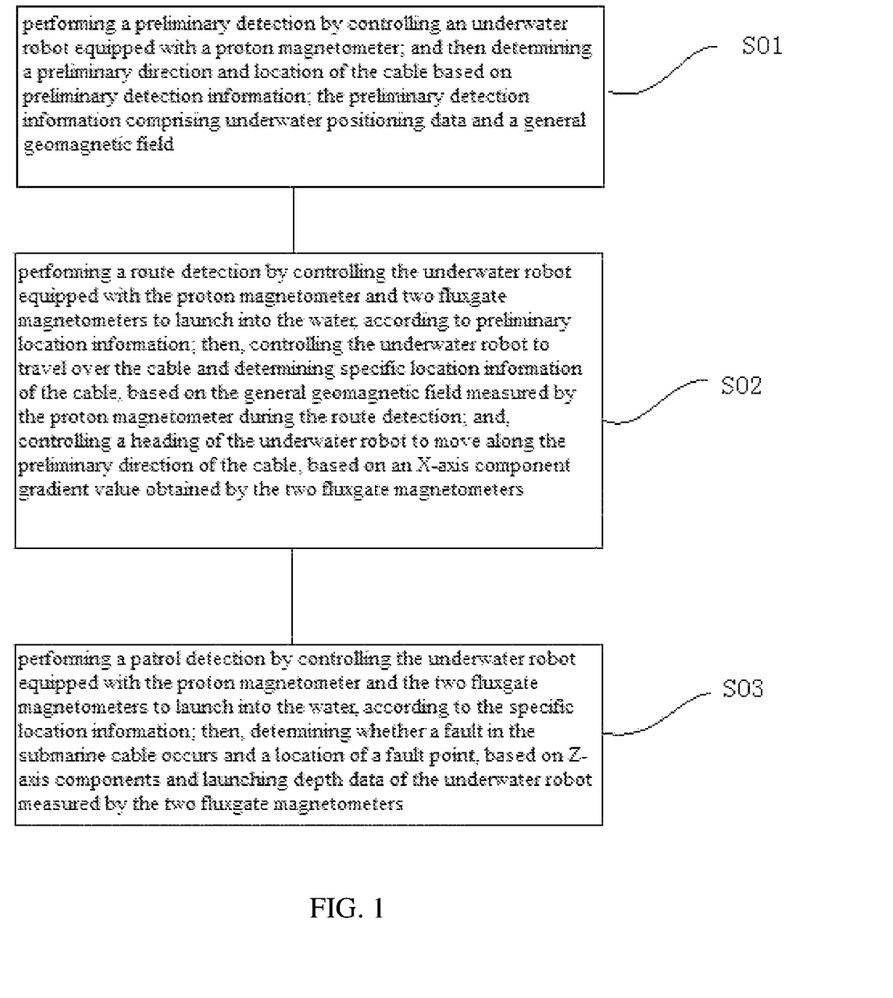
FIG. 1 is the flowchart of the method for geomagnetically detecting a submarine cable according to the present disclosure.

As shown in FIG. 1, a method for geomagnetically detecting a submarine cable, applied to the detection control terminals, may include:

step S01, performing a preliminary detection by controlling an underwater robot equipped with a proton magnetometer; and then determining a preliminary direction and a preliminary location of the cable based on preliminary detection information: the preliminary detection information may include underwater positioning data and a general geomagnetic field;

step S02, performing a route detection by controlling the underwater robot equipped with the proton magnetometer and two fluxgate magnetometers to launch into the water, according to preliminary location information; then, controlling the underwater robot to travel over the cable and determining specific location information of the cable, based on the general geomagnetic field measured by the proton magnetometer during the route detection; and, controlling a heading of the underwater robot to move along the preliminary direction of the cable, based on an X-axis component gradient value obtained by the two fluxgate magnetometers; and step S03, performing a patrol detection by controlling the underwater robot equipped with the proton magnetometer and the two fluxgate magnetometers to launch into the water, according to the specific location information: then, determining whether a fault in the submarine cable occurs and a location of a fault point, based on Z-axis components and launching depth data of the underwater robot measured by the two fluxgate magnetometers;

where the proton magnetometer is installed in front of the underwater robot, and the two fluxgate magnetometers are installed on both sides of the underwater robot.

The present disclosure can solve the search, routing and fault identification of submarine buried cables by comprehensively using the detection data of two kinds of magnetometers equipped with underwater robots, and using the dynamic real-time analysis of the general abnormal field and the three-component gradient field. The two types of magnetometers may be the proton magnetometer and the fluxgate magnetometer. The proton magnetometer can use seaspy2 magnetometer or sniffer4 magnetometer. The fluxgate magnetometer can use mag13 magnetometer or sniffer3 magnetometer. The underwater robot can use autonomous underwater vehicle (hereinafter referred to as AUV).

Figure 2:
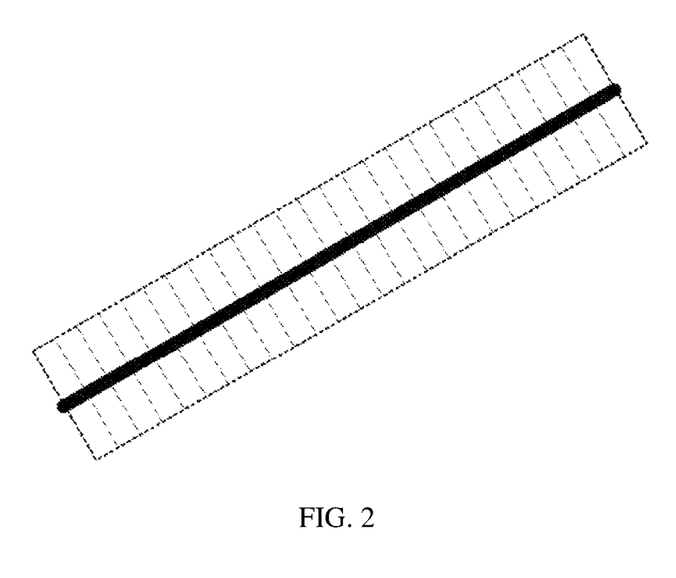
FIG. 2 is a schematic structural diagram showing an underwater robot equipped with a magnetometer.

The detection process of the method of the present disclosure may be divided into three stages, namely the submarine cable search stage in step S01, the submarine cable routing stage in step S02, and the submarine cable fault identification stage in step S03. In the first stage, the underwater robot is only equipped with a proton magnetometer fixed in front of the underwater robot. In the second and third stages, the underwater robot is equipped with a proton magnetometer and two fluxgate magnetometers. The proton magnetometer may be fixedly installed in front of the underwater robot, and the two fluxgate magnetometers may be fixedly installed on both sides of the underwater robot. Preferably, the two fluxgate magnetometers may be installed on both sides of the front of the underwater robot (as shown in FIG. 2), where X1, Y1, Z1 are the X-axis, Y-axis, Z-axis components of the first fluxgate magnetometer, X2, Y2, and Z2 are the X-axis, Y-axis, and Z-axis components of the second fluxgate magnetometer. The X-axis component is the projection value of the general geomagnetic field in the X-axis direction, that is, $B*\cos\theta$, $\theta$ is the angle between the geomagnetic field vector and the positive direction of the X-axis ($0 \leq \theta \leq 180°$), and the value range of the X-axis component is $-B \leq Bx \leq B$. The Y-axis component is the projection value of the general geomagnetic field in the Y-axis direction, and the Z-axis component is the projection value of the general geomagnetic field in the Z-axis direction. The calculation of the Y-axis component and the Z-axis component refers to the calculation of the X-axis component. B is the general geomagnetic field measured by the proton magnetometer.

The step S01 specifically may include:

step S11, determining a comb-shaped path covering an entire detection range as a preliminary detection path of the underwater robot equipped with the proton magnetometer, based on a detection range of the submarine cable;

step S12, performing the preliminary detection according to the preliminary detection path by controlling the underwater robot under a certain launching depth, and recording the preliminary detection information; and step S13, determining the preliminary direction and preliminary location information of the cable based on the preliminary detection information after the preliminary detection of the underwater robot is completed.

Figure 3:
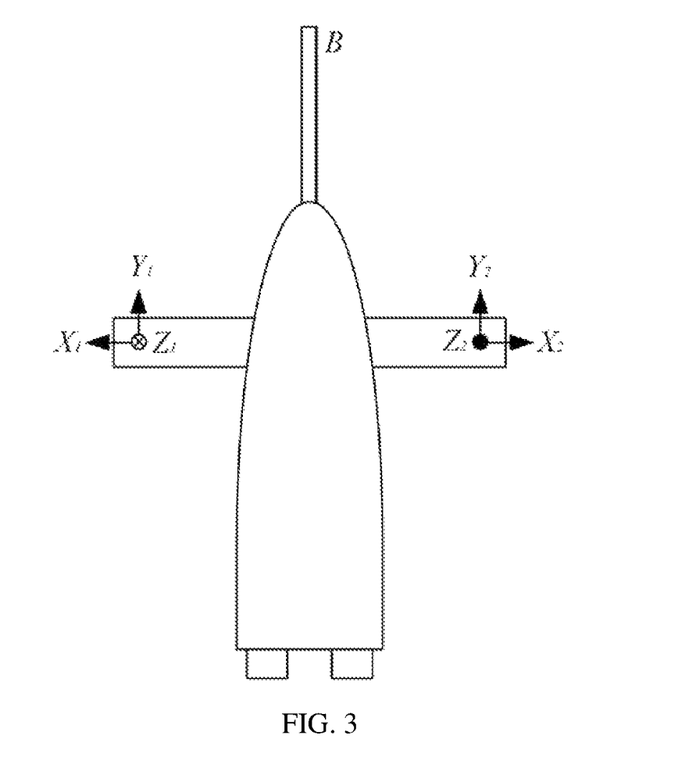
FIG. 3 is a schematic diagram showing a preliminary detection path of an underwater robot.

In step S11, the detection range of the submarine cable may be a rectangular detection range determined based on historical data of the submarine cable. For example, as shown in FIG. 3, the detection range is a rectangular detection range of 1 km*5 km, in which the 1 km wide side may be perpendicular to the direction of the suspected cable, and the 5 km long side may be parallel to the direction of the suspected cable. The path of the underwater robot may be planned as a comb-shaped path covering the entire detection range, the survey line may be parallel to the wide side, and the distance between the survey lines may be 200 m.

After determining the preliminary detection path, in step S12, controlling the underwater robot to travel in the suspected area of the submarine cable at a certain launching depth (for example, 50 meters of launching depth), and reciprocating the detection with a comb-shaped path perpendicular to the suspected cable direction. And during the detection process, the preliminary detection information may be recorded synchronously. Each frame of preliminary detection information may specifically include Greenwich time information, the location information of the underwater robot, and the general geomagnetic field. Each frame of data may have a total of 64 bytes. The data frame may be defined as frame head+date and time+latitude and longitude data+general geomagnetic field data+frame end. For example, a frame of data may be @#DD210308 TT0647538 E122.743251 N29.821433 D0048.1 B34050.240, which means: March 8, 21 GMT, 6:47:53.8; 122.743251° E, 29.821433° N: the water depth: 48.1 meters; and the general geomagnetic field: 34050.24 nT.

During the reciprocating detection (or patrol detection) process, the preliminary detection information may include a plurality of frames of data. After the reciprocating detection is completed, the preliminary location of the cable and the preliminary direction of the cable can be determined in step S13 based on the preliminary detection information in step S12.

The step of determining the preliminary direction and the preliminary location information of the cable based on the preliminary detection information may include: forming a two-dimensional contour map based on the preliminary detection information: correlating dense areas with maximum values or minimum values of geomagnetic locals; and determining the preliminary direction and preliminary location information of the cable.

Specifically, the preliminary detection information may include a plurality of general geomagnetic fields. Based on pipeline construction drawings and previous engineering experience, the dense areas with abnormal values of the general geomagnetic field (extremely high values and extremely low values of the geomagnetic locals) may be associated. The control terminal (pipeline construction drawings and previous engineering experience are stored in the detection control terminal in the form of a big data model) or manual judgment are used to determine the preliminary direction and preliminary location information of the cable. For example, when a dense area with a geomagnetic local extremely high value is displayed on the two-dimensional contour map, the direction of the dense area with the geomagnetic local extremely high value may be the (travelling) direction of the cable.

The step S02 may specifically include:
step S21, determining a launching location of the underwater robot equipped with the proton magnetometer and the two fluxgate magnetometers, according to the preliminary location information;
step S22, controlling the underwater robot to launch at the launching location, and controlling the underwater robot to travel to hover right over the cable;
step S23, controlling the underwater robot to translate along the preliminary direction of the cable according to the preliminary direction of the cable, and adjusting a translation direction of the underwater robot according to a change of the general geomagnetic field measured by the proton magnetometer: determining the location hover right over the cable at a peak of the general geomagnetic field after adjusting the translation direction several times, and determining the specific location information of the cable; and
step S24, controlling the underwater robot to travel, and controlling the heading of the underwater robot to move along the preliminary direction of the cable, based on the X-axis component gradient value obtained by the two fluxgate magnetometers during a travelling process.

In step S21, according to the preliminary location information, the launching point of the underwater robot may be set to be within a certain range, such as within 100 meters, of the sea surface over the cable.

In step S22, the underwater robot may be controlled to launch at the launching location, and the underwater robot may be controlled to travel directly right over the cable, for example, 5 meters hover over the cable.

After that, step S23 is performed to ensure that the underwater robot hovers right over the cable. Specifically, the underwater robot is controlled to translate along the preliminary direction of the cable, such as slow translation along a certain direction of the preliminary direction of the cable. The general geomagnetic field measured by the proton magnetometer will change with the movement of the underwater robot. If it is determined that the general geomagnetic field becomes weak within a certain period of time (it can be set as needed, for example, it may be set to 10 seconds), the moving direction of the underwater robot needs to be adjusted, that is, it slowly translates in the opposite direction of the initial cable direction. When the general geomagnetic field becomes weak again, the moving direction of the underwater robot can be adjusted again, and the underwater robot translates in the opposite direction again, and the same way may be repeated for several times, such as three times, to find out the location of the peak value of the general geomagnetic field (the maximum value of the general geomagnetic field), and the underwater robot is controlled to hover at this location, and the specific location information of the cable can be determined.

Figure 4:
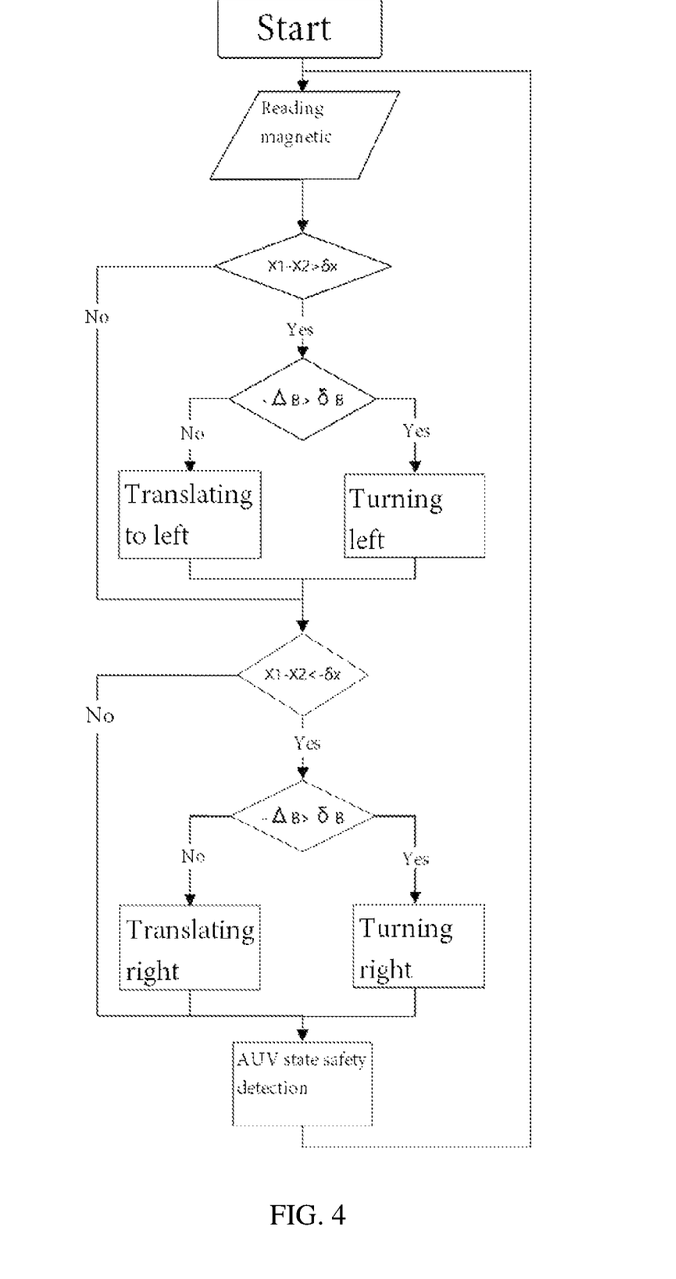
FIG. 4 is a flowchart of controlling the heading of the underwater robot in step S24 in the method for geomagnetically detecting a submarine cable according to the present disclosure.

After that, the step S24 may be executed. That is, the underwater robot is controlled to travel along the preliminary direction of the cable from the current location. In order to ensure that the underwater robot always moves along the preliminary direction of the cable during the travelling process, it is necessary to adjust the heading of the underwater robot in real time based on the X-axis component gradient value obtained by the two fluxgate magnetometers. Specifically (see FIG. 4), when it is determined that the X-axis component gradient value is greater than the X-axis positive gradient threshold δx, and the change value $-\Delta B$ of the general geomagnetic field is greater than the change threshold δB of the general geomagnetic field, the heading direction of the underwater robot is controlled to turn left; when it is determined that the X-axis component gradient value is greater than the X-axis positive gradient threshold δx, and the change value $-\Delta B$ of the general geomagnetic field is not greater than the change threshold δB of the general geomagnetic field, the heading of the underwater robot is controlled to translate to the left: when it is determined that the X-axis component gradient value is less than the X-axis negative gradient threshold $-\delta x$, and the change value $-\Delta B$ of the general geomagnetic field is greater than the general geomagnetic field change threshold δB, the heading of the underwater robot is controlled to turn to the right: when it is determined that the X-axis component gradient value is less than the X-axis negative gradient threshold $-\delta x$, and the change value $-\Delta B$ of the general geomagnetic field not greater than the change threshold δB of the general geomagnetic field, the heading direction of the underwater robot is controlled to translate to the right: among them, the X-axis component gradient value may be the difference between the X-axis component values measured by the two fluxgate magnetometers, that is, X1-X2. In FIG. 4, when it is determined that the X-axis component gradient value is not greater than the X-axis positive gradient threshold δx, and the X-axis component gradient value is not less than the X-axis negative gradient threshold $-\delta x$, it is necessary to perform state safety detection on the underwater robot, and then enter the above judgment process again and adjust the heading. The change value of the general geomagnetic field is the difference between the current general geomagnetic field detected in real time and the general geomagnetic field detected last time. The change threshold of the general geomagnetic field is a preset constant, such as 50 nT. The X-axis gradient threshold is a preset constant, such as 10 nT, that is, the X-axis positive gradient threshold is 10 nT, and the X-axis negative gradient threshold is −10 nT.

To further improve the accuracy of the heading control, after step S23 and before step S24, the specific cable direction is determined. The specific cable direction determined in this process is more accurate than the preliminary cable direction determined in step S01. Specifically, the underwater robot may be controlled to perform multiple 360-degree clockwise and counterclockwise rotations at the hovering location, and based on the X-axis maximum value and the Y-axis maximum value obtained after each rotation, the azimuth angle of the cable may be determined, and then the specific cable direction of the cable may be determined. For example, after a rotation with 360 degrees clockwise and counterclockwise three times in situ, a total of 24 extreme values can be obtained, and all extreme values may be averaged to obtain the azimuth angle of the cable, and then determine the exact direction of the cable. After the specific cable direction is determined, when controlling the heading of the underwater robot when travelling in step S24, the heading needs to be adjusted according to the determined specific cable direction. That is, step S24 is; controlling the underwater robot to travel, and controlling the heading of the underwater robot based on the X-axis component gradient value obtained by the two fluxgate magnetometers to make it move along the specific cable direction during the travelling process.

The step S03 may specifically include:

step S31, determining the launching location of the underwater robot equipped with the proton magnetometer and the two fluxgate magnetometers according to the specific location information;

step S32, controlling the underwater robot to launch at the launching location, and controlling the underwater robot to perform the patrol detection along the direction of the cable under the certain launching depth;

step S33, determining whether a fault in the submarine cable occurs and the location of the fault point based on the Z-axis component values measured by the two fluxgate magnetometers and the launching depth data of the underwater robot.

In step S31, the launching point of the underwater robot may be set according to the specific location information.

In step S32, the underwater robot may be controlled to launch at the launching location, and the underwater robot may be controlled to travel at a certain water depth, such as a 50-meter water depth, or a water depth of 5 meters directly over the cable. The cable direction in the step S32 may be the preliminary direction of the cable (when the step of determining the specific cable direction is not performed), or a specific cable direction. When the cable direction in step S32 is a specific cable direction, accurate inspection and detection can be realized.

Figure 5:
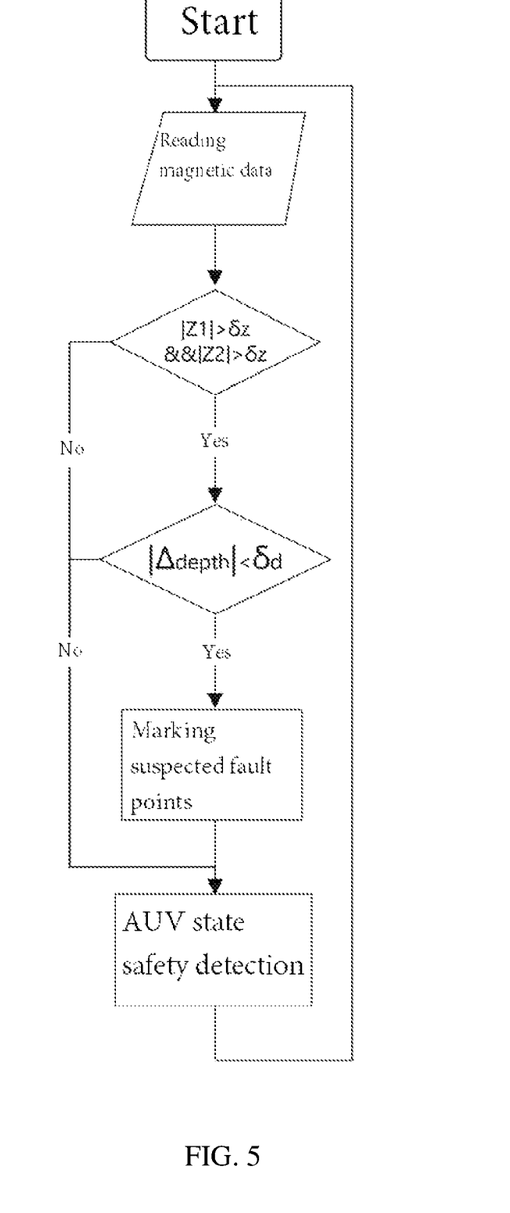
FIG. 5 is a flowchart of step S33 in the method for geomagnetically detecting a submarine cable according to the present disclosure.

Referring to FIG. 5, the step S33 may specifically include:

when it is determined that the absolute values of the Z-axis components of the two fluxgate magnetometers both exceed the Z-axis component thresholds ($|Z1|>\delta z$ and $|Z2|>\delta z$), and the absolute value of the change of the launching depth data of the underwater robot in the same period is less than the threshold value of the change of the launching depth data ($|\Delta depth<\delta d|$), it is determined that the current location of the underwater robot has a fault (that is, a suspected fault point), and the current location is the fault point. When it is determined that the conditions of $|Z1|>\delta z$ and $|Z2|>\delta z$ are not satisfied, and the conditions of $|\Delta depth<\delta d|$ are not satisfied, then the detection control terminal performs state safety detection on the underwater robot, and then the above fault judgment will be performed again. The Z-axis component threshold may be a preset constant, such as $\delta z=50$ nT. The change threshold of the water depth data may be a preset constant, such as $\delta d=0.5$ meters.

The detection control terminal may be a remote control platform connected to the underwater robot in communication.

It should be understood by those skilled in the art that the embodiments of the present disclosure described in the above description and the accompanying drawings are only examples and do not limit the present disclosure. The objects of the present disclosure have been fully and effectively achieved. The functional and structural principles of the present disclosure have been shown and described in the embodiments, and the embodiments of the present disclosure may be changed or modified in any way without departing from the principles.

What is claimed is:

1. A method for geomagnetically detecting a submarine cable, applied to detection control terminals, comprising steps of:

step S01, performing a preliminary detection by controlling an underwater robot equipped with a proton magnetometer; and then determining a preliminary direction and a preliminary location of the cable based on preliminary detection information; the preliminary detection information comprising underwater positioning data and a general geomagnetic field;

step S02, performing a route detection by controlling the underwater robot equipped with the proton magnetometer and two fluxgate magnetometers to launch into the water, according to preliminary location information; then, controlling the underwater robot to travel over the cable and determining specific location information of the cable, based on the general geomagnetic field measured by the proton magnetometer during the route detection; and, controlling a heading of the underwater robot to move along the preliminary direction of the cable, based on an X-axis component gradient value obtained by the two fluxgate magnetometers; and step S03, performing a patrol detection by controlling the underwater robot equipped with the proton magnetometer and the two fluxgate magnetometers to launch into the water, according to the specific location information; then, determining whether a fault in the submarine cable occurs and a location of a fault point, based on Z-axis components and launching depth data of the underwater robot measured by the two fluxgate magnetometers;

where the proton magnetometer is installed in front of the underwater robot, and the two fluxgate magnetometers are installed on both sides of the underwater robot;

wherein the step S02 comprises:

step S21, determining a launching location of the underwater robot equipped with the proton magnetometer and the two fluxgate magnetometers, according to the preliminary location information;

step S22, controlling the underwater robot to launch at the launching location, and controlling the underwater robot to travel to hover right over the cable;

step S23, controlling the underwater robot to translate along the preliminary direction of the cable according to the preliminary direction of the cable, and adjusting a translation direction of the underwater robot according to a change of the general geomagnetic field measured by the proton magnetometer; determining the location hover right over the cable at a peak of the general geomagnetic field after adjusting the translation direction several times, and determining the specific location information of the cable; and step S24, controlling the underwater robot to travel, and controlling the heading of the underwater robot to move along the preliminary direction of the cable, based on the X-axis component gradient value obtained by the two fluxgate magnetometers during a travelling process.

2. The method for geomagnetically detecting a submarine cable according to claim 1, wherein the step S01 comprises:

step S11, determining a comb-shaped path covering an entire detection range as a preliminary detection path of the underwater robot equipped with the proton magnetometer, based on a detection range of the submarine cable;

step S12, performing the preliminary detection according to the preliminary detection path by controlling the underwater robot under a certain launching depth, and recording the preliminary detection information; and step S13, determining the preliminary direction and preliminary location information of the cable based on the preliminary detection information after the preliminary detection of the underwater robot is completed.

3. The method for geomagnetically detecting a submarine cable according to claim 2, wherein determining the preliminary direction and preliminary location of the cable information based on the preliminary detection information comprises:

forming a two-dimensional contour map based on the preliminary detection information;

correlating dense areas with maximum values or minimum values of geomagnetic locals; and determining the preliminary direction and preliminary location information of the cable.

4. The method for geomagnetically detecting a submarine cable according to claim 2, wherein the detection range of the submarine cable is a rectangular detection range determined based on historical data of the submarine cable.

5. The method for geomagnetically detecting a submarine cable according to claim 1, wherein the step S02 further comprises a step of determining a specific direction of the cable: after the step S23 and before the step S24, controlling the underwater robot to rotate clockwise and counterclockwise 360 degrees for several times in a hover position, and determining an azimuth angle of the cable based on an X-axis maximum value and a Y-axis maximum value obtained after each rotation, and then determining the specific direction of the cable; and in the step S24, the heading of the underwater robot is controlled to move along the specific direction of the cable.

6. The method for geomagnetically detecting a submarine cable according to claim 1, wherein controlling the heading of the underwater robot to move along the preliminary direction of the cable, based on the X-axis component gradient value obtained by the two fluxgate magnetometers during a travelling process comprises:

controlling the heading of the underwater robot to turn to a left, when it is determined that the X-axis component gradient value is greater than an X-axis positive gradient threshold, and a change value of the general geomagnetic field is greater than a change threshold of the general geomagnetic field;

controlling the heading of the underwater robot to translate to the left, when it is determined that the X-axis component gradient value is greater than the X-axis positive gradient threshold and the change value of the general geomagnetic field is not greater than the change threshold of the general geomagnetic field;

controlling the heading of the underwater robot to turn to a right, when it is determined that the X-axis component gradient value is less than the X-axis negative gradient threshold, and the change value of the general geomagnetic field is greater than the change threshold of the general geomagnetic field;

controlling the heading of the underwater robot to translate to the right, when it is determined that the X-axis component gradient value is less than the X-axis negative gradient threshold, and the change value of the general geomagnetic field is not greater than the change threshold of the general geomagnetic field; and where the X-axis component gradient value is a difference between X-axis component values measured by the two fluxgate magnetometers.

7. The method for geomagnetically detecting a submarine cable according to claim 1, wherein the step S03 comprises:

step S31, determining the launching location of the underwater robot equipped with the proton magnetometer and the two fluxgate magnetometers according to the specific location information;

step S32, controlling the underwater robot to launch at the launching location, and controlling the underwater robot to perform the patrol detection along the direction of the cable under a certain launching depth; and step S33, determining whether a fault in the submarine cable occurs and a location of the fault point based on the Z-axis component values measured by the two fluxgate magnetometers and the launching depth data of the underwater robot.

8. The method for geomagnetically detecting a submarine cable according to claim 7, wherein the step S33 specifically comprises:

determining that a current location of the underwater robot has the fault, and the current location is the location of the fault point, when it is determined that absolute values of the Z-axis component values of the two fluxgate magnetometers both exceed a Z-axis component threshold, and an absolute value of a change of the launching depth data of the underwater robot in a same period is less than a change threshold of the launching depth data.

9. The method for geomagnetically detecting a submarine cable according to claim 1, wherein the two fluxgate magnetometers are respectively installed on both sides of the front of the underwater robot.

10. The method for geomagnetically detecting a submarine cable according to claim 5, wherein the step S03 comprises:

step S31, determining the launching location of the underwater robot equipped with the proton magnetometer and the two fluxgate magnetometers according to the specific location information;

step S32, controlling the underwater robot to launch at the launching location, and controlling the underwater robot to perform the patrol detection along the direction of the cable under a certain launching depth; and step S33, determining whether a fault in the submarine cable occurs and the location of the fault point based on the Z-axis component values measured by the two fluxgate magnetometers and the launching depth data of the underwater robot.

11. The method for geomagnetically detecting a submarine cable according to claim 10, wherein the step S33 specifically comprises:

determining that a current location of the underwater robot has the fault, and the current location is the location of the fault point, when it is determined that absolute values of the Z-axis component values of the two fluxgate magnetometers both exceed a Z-axis component threshold, and an absolute value of a change of the launching depth data of the underwater robot in a same period is less than a change threshold of the launching depth data.

* * * * *